United States Patent
Nohara et al.

(10) Patent No.: US 9,079,360 B2
(45) Date of Patent: Jul. 14, 2015

(54) PROCESS FOR PRODUCING MOLDED ARTICLE OF EXPANDED POLYOLEFIN-BASED RESIN BEADS, AND MOLDED ARTICLE OF EXPANDED POLYOLEFIN-BASED RESIN BEADS

(75) Inventors: Tokunobu Nohara, Yokkaichi (JP); Mitsuru Shinohara, Yokkaichi (JP); Takuya Chiba, Yokkaichi (JP); Masaharu Oikawa, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 99 days.

(21) Appl. No.: 13/994,387

(22) PCT Filed: Dec. 8, 2011

(86) PCT No.: PCT/JP2011/078419
§ 371 (c)(1),
(2), (4) Date: Jun. 14, 2013

(87) PCT Pub. No.: WO2012/081490
PCT Pub. Date: Jun. 21, 2012

(65) Prior Publication Data
US 2013/0266792 A1 Oct. 10, 2013

(30) Foreign Application Priority Data
Dec. 15, 2010 (JP) ................. 2010-278987

(51) Int. Cl.
*B29C 67/20* (2006.01)
*C08J 9/00* (2006.01)
*C08J 9/12* (2006.01)
*C08J 9/18* (2006.01)
*C08J 9/232* (2006.01)

(52) U.S. Cl.
CPC .............. *B29C 67/20* (2013.01); *B29C 67/205* (2013.01); *C08J 9/0061* (2013.01); *C08J 9/122* (2013.01); *C08J 9/18* (2013.01); *C08J 9/232* (2013.01); *C08J 2323/12* (2013.01); *C08J 2323/14* (2013.01)

(58) Field of Classification Search
CPC ...... B29C 67/20; B29C 67/205; C08J 9/0061; C08J 9/122; C08J 9/18; C08J 9/232; C08J 2323/12; C08J 2323/14
USPC .................... 428/221, 403; 264/109; 263/109
IPC ........ B29C 67/20, 67/205; C08J 9/228, 9/0061, C08J 9/18, 9/232, 9/122
See application file for complete search history.

(56) References Cited

U.S. PATENT DOCUMENTS

| | | | | |
|---|---|---|---|---|
| 5,622,756 A | * | 4/1997 | Tokoro et al. | 428/36.5 |
| 6,034,144 A | * | 3/2000 | Shioya et al. | 521/60 |
| 6,077,875 A | * | 6/2000 | Sasaki et al. | 521/60 |
| 6,133,331 A | * | 10/2000 | Oikawa et al. | 521/60 |
| 6,313,184 B1 | * | 11/2001 | Sasaki et al. | 521/56 |
| 8,779,019 B2 | * | 7/2014 | Nakayama | 521/144 |
| 2002/0182399 A1 | | 12/2002 | Tokoro et al. | |
| 2009/0169895 A1 | * | 7/2009 | Nohara et al. | 428/407 |
| 2009/0182399 A1 | * | 7/2009 | Sylvestre | 607/99 |

FOREIGN PATENT DOCUMENTS

| | | | |
|---|---|---|---|
| CN | 101469085 A | | 7/2009 |
| JP | S46-38359 B | | 11/1971 |
| JP | 4-46217 B | | 7/1987 |
| JP | 4-372630 A | | 12/1992 |
| JP | 8-108441 A | | 4/1996 |
| JP | 11-207759 A | | 8/1999 |
| JP | 2004-068016 A | | 3/2004 |
| JP | 2009-173021 A | | 8/2009 |
| JP | 2009-203417 | * | 9/2009 |
| JP | 2009-203417 A | | 9/2009 |
| JP | 2009-280783 | * | 12/2009 |
| JP | 2009-280783 A | | 12/2009 |
| TW | 294691 B | | 1/1997 |

OTHER PUBLICATIONS

International Search Report in PCT/JP2011/078419, Feb. 7, 2012.
Chinese Search Report dated Nov. 5, 2014, for CN 201180059865, and English translation thereof.

* cited by examiner

*Primary Examiner* — Leszek Kiliman
(74) *Attorney, Agent, or Firm* — Bacon & Thomas, PLLC

(57) ABSTRACT

A process produces a polyolefin-based resin expanded beads molded article that is excellent in bending deflection characteristics, high in porosity, low in bulk density and light in weight, and has interconnected void spaces. The process comprises filling, in a mold cavity, multi-layered polyolefin-based resin expanded beads each of which has a cylindrical, polyolefin-based resin expanded core layer and a polyolefin-based resin outer layer covering the expanded core layer and which satisfy specific requirements, introducing steam in the mold cavity to heat the multi-layered expanded beads filled in the mold cavity to fuse bond and mold the multi-layered expanded beads in the mold cavity.

4 Claims, 1 Drawing Sheet

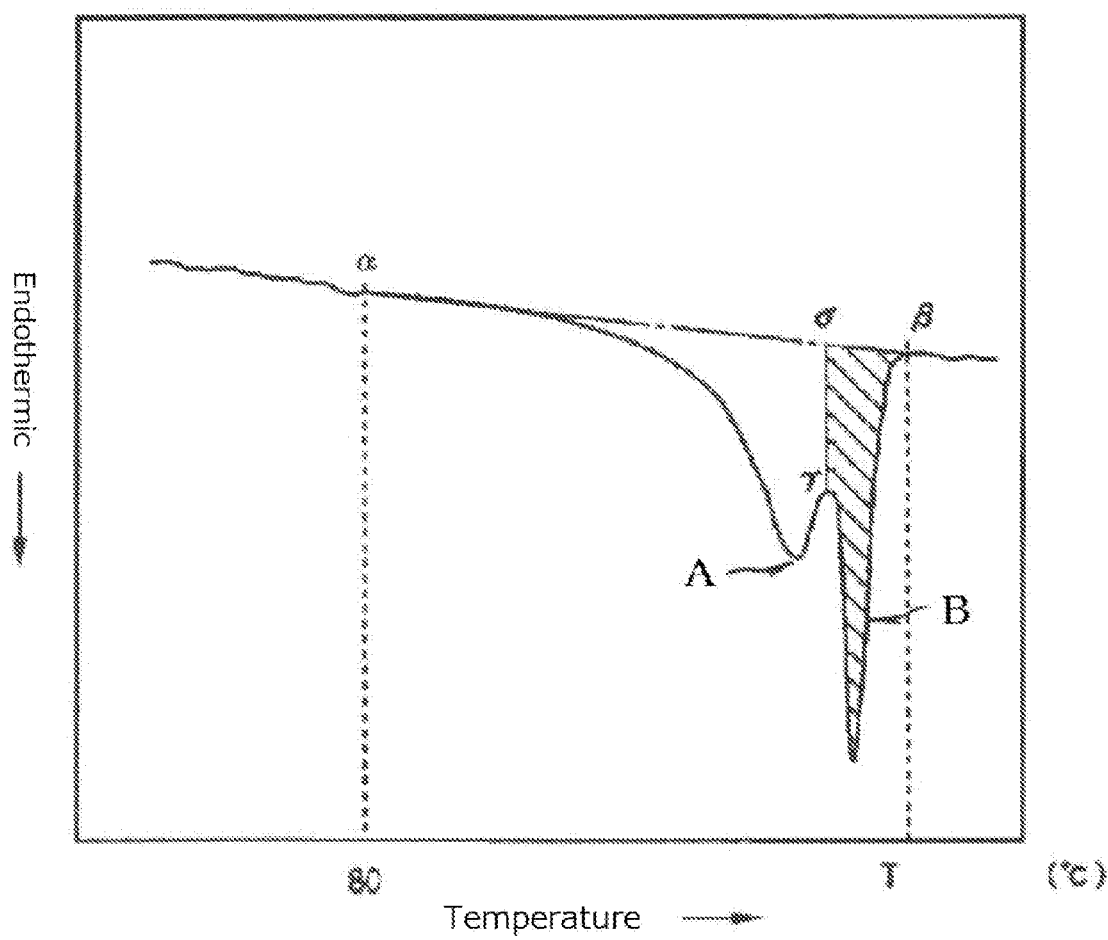

PROCESS FOR PRODUCING MOLDED ARTICLE OF EXPANDED POLYOLEFIN-BASED RESIN BEADS, AND MOLDED ARTICLE OF EXPANDED POLYOLEFIN-BASED RESIN BEADS

BACKGROUND OF THE INVENTION

A. Field of the Invention

The present invention relates to a process for producing a polyolefin-based resin expanded beads molded article and to a polyolefin-based resin expanded beads molded article. More specifically, the present invention is directed to a process for producing a polyolefin-based resin expanded beads molded article having interconnected void spaces and to a polyolefin-based resin expanded beads molded article.

B. Background Art

An expanded molded article of a polyolefin-based resin having void spaces excels in properties such as water permeability, gas permeability and sound absorbing property and has proper rigidity and elasticity and, therefore, is used as a drainage material, a wall material for buildings, an interior material for automobiles, etc. As the range of uses of such polyolefin-based resin expanded molded articles having interconnected void spaces is widened in recent years, requirements for performance of molded articles with a porosity further increase. Thus, molded articles with a high porosity are demanded in order to improve their characteristics such as water permeability, gas permeability and sound absorbing properties. Moreover, there is a demand for expanded beads molded articles having high fusion bonding strength between expanded beads and excellent bending deflection characteristics from the viewpoint of durability and impact resistance.

As a method for producing a polyolefin-based resin expanded beads molded article having a high porosity, there has been hitherto known a method in which cylindrical thermoplastic resin expanded beads each having a throughhole are molded into an expanded beads molded article.

For example, JP-A-H08-108441 discloses production of a molded article having void spaces using polyolefin-based resin expanded beads each having a throughhole.

JP-A-2004-68016 discloses the use of cylindrical polyolefin-based resin expanded beads each having a core layer formed of a polypropylene-based resin and an outer layer formed of a polypropylene-based resin having lower melting point than that of the core layer for producing an expanded beads molded article having a high porosity.

Molding of the expanded beads disclosed in JP-A-H08-108441 in a mold cavity can give an expanded beads molded article having void spaces. When an expanded beads molded article having a higher porosity and a low bulk density is produced with this method, however, it is necessary to perform the in-mold molding under conditions which can prevent the expanded beads from undergoing secondary expansion in order to avoid a reduction of the porosity. Thus, JP-A-H08-108441 is problematic when an expanded beads molded article having high fusion bonding strength and, therefore, excellent bending deflection characteristics is intended to be produced.

Molding of the expanded beads disclosed in JP-A-2004-68016 in a mold cavity can achieve higher porosity and higher fusion bonding strength than those attained by conventional methods. Even when the expanded beads are molded in the mold cavity after having been subjected to an inside pressure increasing treatment for improving their secondary expansion properties, however, it is still difficult to obtain a light-weight polyolefin-based resin expanded beads molded article having excellent bending deflection characteristics, a high porosity and a lower bulk density.

SUMMARY OF THE INVENTION

It is, therefore, an object of the present invention to provide a process for producing a light-weight polyolefin-based resin expanded beads molded article having excellent bending deflection characteristics, a high porosity and a low bulk density and to provide a light-weight polyolefin-based resin expanded beads molded article having excellent bending deflection characteristics, a high porosity and a low bulk density.

In accordance with the present invention, there are provided a polyolefin-based resin expanded beads molded article and a process for producing a polyolefin-based resin expanded beads molded article as shown below.

[1] A process for producing a polyolefin-based resin expanded beads molded article having interconnected void spaces, comprising:

providing multi-layered polyolefin-based resin expanded beads each having a cylindrical, polyolefin-based resin expanded core layer and a polyolefin-based resin outer layer covering the expanded core layer, the multi-layered polyolefin-based resin expanded beads satisfying requirements (a) to (d) shown below, filling the multi-layered polyolefin-based resin expanded beads in a mold cavity, and then introducing steam in the mold cavity to heat the multi-layered polyolefin-based resin expanded beads filled in the mold cavity, so that the multi-layered polyolefin-based resin expanded beads are fuse-bonded together and molded in the mold cavity, (a) the multi-layered polyolefin-based resin expanded beads have an apparent density of 10 to 200 g/L, (b) the multi-layered polyolefin-based resin expanded beads, when measured by heat flux differential scanning calorimetry in which 2 to 10 mg thereof are heated from 23° C. to 220° C. at a heating speed of 10° C./min, give a DSC curve having an endothermic peak "A" which is intrinsic to the polyolefin-based resin and one or more endothermic peaks "B" which are located on a higher temperature side of the endothermic peak "A" and which have a heat of fusion of 50 J/g or less, (c) the polyolefin-based resin forming the expanded core layer of each of the multi-layered polyolefin-based resin expanded beads has a melting point Tc and the polyolefin-based resin forming the outer layer of each of the multi-layered polyolefin-based resin expanded beads has a melting point Ts, wherein Tc and Ts satisfy the following equation (1):

$$Tc(°C.) > Ts(°C.) \qquad (1)$$

(d) each of the multi-layered polyolefin-based resin expanded beads satisfies the following equations (2) and (3):

$$d_{MIN} \geq 1.0 \text{ (mm)} \qquad (2)$$

$$d_{MIN}/D_{MIN} \leq 0.70 \qquad (3)$$

wherein $d_{MIN}$ represents a minimum diameter in mm of the throughhole of the multi-layered polyolefin-based resin expanded bead as measured on a cross-section taken along a plane normal to the axial direction of the throughhole and $D_{MIN}$ represents a minimum diameter in mm of the expanded bead as measured on said cross-section.

[2] The process for producing a polyolefin-based resin expanded beads molded article according to above [1], wherein the apparent density of the multi-layered polyolefin-based resin expanded beads is in such a relationship with a bulk density thereof as to meet the following equation (4):

$$40 \leq ((\text{apparent density} - \text{bulk density})/\text{apparent density}) \times 100 \leq 70 \quad (4)$$

[3] The process for producing a polyolefin-based resin expanded beads molded article according to above [1] or [2], wherein the molding vapor pressure used for molding in the mold cavity is 0.3 MPa(G) or less.

[4] the process for producing a polyolefin-based resin expanded beads molded article according to any one of above [1] to [3], wherein the polyolefin-based resin expanded core layer and the polyolefin-based resin outer layer are formed of polypropylene-based resins, and wherein the polypropylene-based resin forming the expanded core layer has a bending modulus of Mc and the polypropylene-based resin forming the outer layer has a bending modulus of Ms and wherein Mc and Ms satisfy the following equations (5) and (6):

$$Mc \leq 1300 \text{ (MPa)} \quad (5)$$

$$Mc - Ms \leq 600 \text{ (MPa)} \quad (6)$$

[5] A polyolefin-based resin expanded beads molded article obtainable by molding, in a mold cavity, multi-layered expanded beads each of which has a cylindrical, polyolefin-based resin expanded core layer and a polyolefin-based resin outer layer covering the expanded core layer and satisfies the following equation (7):

$$Tc(° C.) > Ts(° C.) \quad (7)$$

wherein Tc represents a melting point of the polyolefin-based resin forming the expanded core layer and Ts represents a melting point of the polyolefin-based resin forming the outer layer, said expanded beads molded article having a bulk density of 10 to 100 g/L and a porosity of 20% or higher and less than 50%, said expanded beads molded article, when measured by heat flux differential scanning calorimetry in which 2 to 10 mg thereof are heated from 23° C. to 220° C. at a heating speed of 10° C./min, shows an endothermic peak "C" which is intrinsic to the polyolefin-based resin and one or more endothermic peaks "D" which are located on a higher temperature side of the endothermic peak "C" and which have a heat of fusion of 50 J/g or less, said expanded beads molded article having a maximum bending deflection Y, in mm, which satisfies the following equations (8) and (9):

$$Y \geq 5 \quad (8)$$

$$Y \geq -0.2X + 20 \quad (9)$$

wherein Y represents the maximum bending deflection in mm as measured by a bending test method according to JIS K7221-2 (1999) and X represents a bulk density in g/L of the polyolefin-based resin expanded beads molded article.

Effect of the Invention

According to the process for producing a polyolefin-based resin expanded beads molded article (hereinafter occasionally referred to simply as "expanded beads molded article"), it is possible to perform the molding in a mold cavity in a broad range of molding vapor pressure, since the process uses cylindrical multi-layered expanded beads which have a specific combination of a polyolefin-based resin expanded core layer and a polyolefin-based resin outer layer and whose high temperature peak is controlled to have a low calorific value. In particular, when the in-mold molding is carried out at a low molding vapor pressure, it is possible to fuse bonding the expanded beads to each other while preventing a reduction of porosity of the expanded beads molded article at the time of the in-mold molding.

The polyolefin-based resin expanded beads molded article shows high fusion bonding strength between the expanded beads from which the expanded beads molded article is formed and, therefore, excellent bending deflection characteristics. Yet, the expanded beads molded article has a high porosity and is low in bulk density and excellent in light weight property and durability such as bending deflection characteristics.

BRIEF DESCRIPTION OF THE DRAWING

FIG. 1 is diagram showing an example of a chart of a first time DSC curve of multi-layered expanded beads used in the present invention.

DETAILED DESCRIPTION OF PREFERRED EMBODIMENTS

A process for producing a polyolefin-based resin expanded beads molded article and also a polyolefin-based resin expanded beads molded article according to the present invention will be described in detail below.

In the process of the present invention, use is made of multi-layered polyolefin-based resin expanded beads (hereinafter occasionally referred to simply as "multi-layered expanded beads") each having a polyolefin-based resin expanded core layer (hereinafter occasionally referred to simply as "expanded core layer") and a polyolefin-based resin outer layer (hereinafter occasionally referred to simply as "outer layer") which covers the expanded core layer. Meanwhile, it is not necessary that the outer layer should cover the entire surface of the expanded core layer. For example, as long as the intended effects of the present invention are not impaired, a part of the expanded core layer, such as end faces of the cylindrical expanded bead, may be left uncovered with the outer layer.

The polyolefin-based resin forming the multi-layered expanded beads is a polymer containing an olefin as a primary monomer component and is preferably a resin containing at least 50% by weight, more preferably at least 70% by weight, still more preferably at least 90% by weight, of olefin components. The composition and method for preparation of the polyolefin-based resin are not specifically limited. Examples of the polyolefin-based resin include polypropylene-based resin, polyethylene-based resin, polybutene-based resin and mixtures of these resins.

The polypropylene-based resin may be, for example, a propylene homopolymer, a copolymer of propylene and another comonomer or a mixture of two or more of these polymers. As the copolymer, there may be mentioned, for example, a propylene-ethylene random copolymer, a propylene-ethylene block copolymer and a propylene-ethylene-butene random terpolymer. The polyethylene-based resin may be, for example, a high density polyethylene, a medium density polyethylene, a low density polyethylene, a linear low density polyethylene, a very low density polyethylene, an ethylene-vinyl acetate copolymer, an ethylene-acrylic acid copolymer, an ethylene-alkyl acrylate copolymer, an ethylene-methacrylic acid copolymer or an ethylene-alkyl methacrylate copolymer.

Among the above polyolefin-based resins, polyethylene-based resins or polypropylene-based resins are preferred and are selected as appropriate for forming the expanded core layer and outer layer in the present invention. From the viewpoint of adhesion between the expanded core layer and outer layer, polypropylene-based resins are particularly preferred.

To the polyolefin-based resin forming the expanded core layer and outer layer, synthetic resins (other than the polyolefin-based resin), synthetic rubbers and/or elastomers may be added as long as the intended effects of the present invention are not impaired. The blending amount of the synthetic resins (other than the polyolefin-based resin), synthetic rubbers and/or elastomers, is preferably 35 parts by weight or less, more preferably 20 parts by weight or less, still more preferably 10 parts by weight or less, most preferably 5 parts by weight or less, per 100 parts by weight of the polyolefin-based resin.

Examples of the synthetic resin other than the polyolefin-based resin include polystyrene-based resins such as polystyrene and styrene-maleic anhydride copolymers.

Examples of the synthetic rubber include ethylene-propylene rubber, ethylene-1-butene rubber, propylene-1-butene rubber, styrene-butadiene rubber or its hydrogenation product, isoprene rubber, neoprene rubber and nitrile rubber. Examples of the elastomer include styrene-butadiene block copolymer elastomer and its hydrogenation product.

Various kinds of additives may be added to the polyolefin-based resin as needed. Examples of the additive include an antioxidant, a UV absorbing agent, an antistatic agent, a flame retardant, a metal deactivator, a pigment, a dye, a nucleating agent and a cell controlling agent. As the cell controlling agent, there may be mentioned an inorganic powder such as zinc borate, talc, calcium carbonate, borax and aluminum hydroxide.

In the multi-layered expanded beads used in the present invention, it is necessary that the melting point $Ts(°C.)$ of the polyolefin-based resin forming the outer layer should be lower than the melting point $Tc(°C.)$ of the polyolefin-based resin forming the expanded core layer, namely, $Tc$ and $Ts$ should satisfy the following equation (1):

$$Tc(°C.) > Ts(°C.) \quad (1)$$

When the above requirement is met, an expanded beads molded article having good fusion bonding between the expanded beads may be produced in a wide range of molding vapor pressures used for the in-mold molding. Further, an expanded beads molded article having further improved fusion bonding between the expanded beads may be produced, even when the in-mold molding is carried out using steam having a vapor pressure lower than the minimum molding vapor pressure (molding pressure) required when single-layered cylindrical expanded beads, which have no outer layer and which are formed of the same base resin as that forming the expanded core layer of the multi-layered expanded beads, are molded in a mold cavity. Namely, because the melting point of the polyolefin-based resin forming the outer layer is lower than that of the expanded core layer, the efficiency of fusion bonding between the expanded beads is improved. As a consequence, even when steam with a low vapor pressure is used, it is possible to obtain an expanded beads molded article having such fusion bonding strength as to give good bending deflection characteristics.

When the single-layered expanded beads formed of the same base resin as that forming the expanded core layer are molded in a mold cavity, the molding vapor pressure used in the in-mold molding is within a range that is in match with the melting point $Tc$ of the base resin of the single-layered expanded beads. In the case of the present invention, on the other hand, because the melting point $Ts$ of the resin forming the outer layer is lower than $Tc$, an expanded beads molded article having excellent fusion bonding may be produced at such a low molding vapor pressure that will cause bonding failure if a conventional technique is adopted.

Thus, the greater a difference [$Tc-Ts$] between $Ts$ and $Tc$ is, the lower the temperature that permits fusion bonding can be made. Further, the greater the difference [$Tc-Ts$], the lower the molding vapor pressure at the time of in-mold molding can be made. From this point of view, it is preferred that the melting point $Ts(°C.)$ of the polyolefin-based resin of the outer layer be lower by at least 3° C. ($Tc-Ts \geq 3$), more preferably at least 5° C. ($Tc-Ts \geq 5$), still more preferably at least 10° C. ($Tc-Ts \geq 10$), than the melting point $Tc(°C.)$ of the polyolefin-based resin of the expanded core layer. The upper limit of the difference in melting point, on the other hand, is preferably 45° C. ($45 \geq Tc-Ts$), more preferably 35° C. ($35 \geq Tc-Ts$). When the difference in melting point is excessively large, there is a possibility that the outer layer is separated from the expanded core layer during in-mold molding and the resin of the outer layer deposits on the mold with the results that the production efficiency is deteriorated.

When the expanded core layer and the outer layer are formed of polypropylene-based resins, the melting point $Tc$ of the resin forming the expanded core layer is preferably 110° C. to 170° C. for reasons of in-mold moldability. From the viewpoint of reduction of the molding vapor pressure, the melting point $Tc$ is preferably 160° C. or less.

The melting point as used herein is a value as measured by the following method. Using a differential scanning calorimeter, a polyolefin-based resin (2 to 10 mg) sampled from the expanded core layer or outer layer is heated from 23° C. to 220° C. at a heating rate of 10° C./minute (first time heating), maintained at 220° C. for 10 minutes, then cooled from 220° C. to 30° C. at a cooling rate of 10° C./minute, and again heated from 30° C. to 220° C. at a heating rate of 10° C./minute (second time heating) while measuring a DSC curve. The peak temperature of an endothermic peak in the DSC curve obtained in the second time heating (second time heating DSC curve) is the melting point for the purpose of the present invention. When a plurality of endothermic peaks are present in the DSC curve, the peak temperature of the endothermic peak having the largest area represents the melting point. The differential scanning calorimetry is carried out according to JIS K7121(1987).

When the polyolefin-based resin forming the outer layer does not show a melting point, a Vicat softening point thereof is used in lieu of the melting point. Thus, the resins of the core layer and outer layer of the multi-layered expanded beads may be determined by their Vicat softening points in the same manner as determined by the melting points. The Vicat softening point of the resin forming the core layer is preferably 80 to 160° C., more preferably 100 to 150° C., for the reasons similar to those in the case of the melting point. The upper limit of the difference in Vicat softening point between the resin forming the core layer and the resin forming the outer layer is preferably 45° C., more preferably 40° C., while the lower limit of the difference in Vicat softening point is preferably 3° C., more preferably 5° C., still more preferably 10° C.

As used herein, the Vicat softening point is measured by the A50 method according to JIS K7206(1999).

The multi-layered expanded beads used in the present invention have an apparent density of 10 to 200 g/L. When the apparent density of the multi-layered expanded beads is excessively low, shrinkage of an expanded beads molded article obtained therefrom is so significant that it is not possible to obtain a desired expanded beads molded article. When the apparent density of the multi-layered expanded beads is excessively high, on the other hand, there is a possibility that it is difficult to obtain an expanded beads molded article having excellent bending deflection characteristics. From this point of view, the lower limit of the apparent density of the multi-layered expanded beads is preferably 12 g/L, while the upper limit of the apparent density of the multi-layered expanded beads is preferably 150 g/L, more preferably 100 g/L.

As used herein, the apparent density of the multi-layered expanded beads is measured by the following method. Expanded beads are allowed to stand in an atmosphere at 23° C. and a relative humidity of 50% under 1 atm pressure for 2 days. The resulting expanded beads of about 500 mL (weight: W(g))) are immersed in an alcohol (ethanol for example) at 23° C. contained in a graduated cylinder using a metal wire, etc. From the rise of the alcohol level in the graduated cylinder, the apparent volume V (L) of the sampled expanded beads is determined. The apparent density is calculated by dividing the weight of the sampled expanded beads by the volume thereof (W/V).

The multi-layered polyolefin-based resin expanded beads used in the present invention, when measured by heat flux differential scanning calorimetry in which 2 to 10 mg thereof are heated from 23° C. to 220° C. at a heating speed of 10° C./min, must give a DSC curve (first time heating DSC curve) having an endothermic peak "A" which is intrinsic to the polyolefin-based resin (hereinafter occasionally referred to simply as "intrinsic peak") and one or more endothermic peaks "B" (hereinafter occasionally referred to simply as "high temperature peak") which are located on a higher temperature side of the endothermic peak "A" and which have a heat of fusion of 50 J/g or less. When the calorific value of the high temperature peak is excessively large, it is difficult to obtain an expanded beads molded article having high fusion bonding strength by in-mold molding under a wide range of molding pressures, in particular, under low molding pressures, because the secondary expansion properties of the expanded beads are excessively suppressed. There is, thus, a fear that it becomes difficult to obtain an expanded beads molded article having excellent bending deflection characteristics and a low bulk density. Namely, in the present invention, by controlling the calorific value of the high temperature peak to a low level, the expanded beads can be secondarily expanded and fuse-bonded to each other in the in-mold molding stage while preventing a reduction of porosity of the molded article and attaining such a fusion bonding strength as to provide excellent bending deflection characteristics. The upper limit of the high temperature peak calorific value is preferably 40 J/g, more preferably 30 J/g, still more preferably 23 J/g, while the lower limit is preferably 2 J/g, more preferably 3 J/g, still more preferably 5 J/g, particularly preferably 10 J/g. When the high temperature peak calorific value is too low, there is a fear that secondary expansion excessively occurs and porosity is reduced.

As used herein, the first time heating DSC curve, intrinsic peak calorific value and high temperature peak calorific value are measured by a measuring method according to JIS K7122 (1987) as follows.

Expanded beads (2 to 10 mg) are sampled and heated using a differential scanning calorimeter from 23° C. to 220° C. at a heating rate of 10° C./minute to obtain a first heating DSC curve. An example of such a DSC curve is shown in FIG. 1.

The DSC curve shown in FIG. 1 has an intrinsic peak "A" attributed to the polyolefin-based resin forming the expanded beads and a high temperature peak "B" located on a high temperature side of the intrinsic peak. The calorific value of the high temperature peak "B" corresponds to the area of the peak and is determined in the manner specifically described below.

First, a straight line (α-β) extending between a point α on the DSC curve at 80° C. and a point β on the DSC curve at a melting completion temperature T of the expanded beads is drawn. The melting completion temperature T is a temperature of an intersection at which the DSC curve on a high temperature side of the high temperature peak "B" meets the base line.

Next, a line which is parallel with the ordinate and which passes a point y on the DSC curve at the bottom of the valley between the intrinsic peak "A" and the high temperature peak "B" is drawn. This line crosses the line (α-β) at a point σ. The area of the high temperature peak "B" is the area (shaded portion in FIG. 1) defined by the curve of the high temperature peak "B", the line (σ-β) and the line (γ-σ), and corresponds to the calorific value of the high temperature peak.

Incidentally, the high-temperature peak "B" appears in the DSC curve measured in the first time heating as described above, but does not appear in the DSC curve obtained during heating in the second time. In the second time heating DSC curve, only the endothermic peak inherent to the polyolefin-based resin resin forming the expanded beads is present.

When expanded PP beads having a weight per bead of less than 2 mg are measured for the intrinsic peak and high temperature peak using a differential scanning calorimeter, two or more beads are sampled in such a manner that the total weight of the sample is in the range of 2 to 10 mg and are used as such for the measurement. When expanded PP beads to be measured have a weight per bead of 2 to 10 mg, one bead is sampled and used as such for the DSC measurement. When expanded PP beads to be measured have a weight per bead of more than 10 mg, one of the beads is cut into two or more pieces along a plane that passes through the center thereof. The obtained piece having a weight of 2 to 10 mg is sampled for the DSC measurement. The cut sample is obtained from one expanded bead using a cutter, etc. In sampling, it must be of course avoided to cut the expanded bead such that the proportion of the outer layer region and the expanded core layer region of the cut sample varies from that of the whole expanded bead (for example, to intentionally cut the expanded bead so as to increase the proportion of the outer layer). In an example of the proper sampling from an expanded bead with a weight of 18 mg, the expanded bead held in an arbitrary position is cut horizontally at the center of the vertical height, whereby two pieces of samples weighing about 9 mg and having a similar shape are obtained. The proportion of the coating layer and expanded core layer in each of the cut samples is similar to that in the original expanded bead. One of the two cut samples thus obtained may be used for the above-described measurement of the intrinsic peak and the high temperature peak.

The multi-layered expanded beads used in the present invention are each cylindrical in shape and satisfy the following equations (2) and (3):

$$d_{MIN} \geq 1.0 \text{ (mm)} \qquad (2)$$

$$d_{MIN}/D_{MIN} \leq 0.70 \qquad (3)$$

wherein $d_{MIN}$ represents a minimum diameter in mm of the throughhole of the multi-layered expanded bead as measured on a cross-section taken along a plane normal to the axial direction of the throughhole and $D_{MIN}$ represents a minimum diameter in mm of the expanded bead as measured on the cross-section from which $d_{MIN}$ is determined.

The use of the cylindrical expanded beads can make it possible to obtain an expanded beads molded article having a high porosity without causing shrinkage thereof. In the present invention, the term "cylindrical, multi-layered polyolefin-based resin expanded bead" is intended to mean that the expanded bead is in the shape of a column, such as a circular cylinder, an ellipsoidal cylinder or a polygonal cylinder, and has one or more throughholes (open-end tubular holes) extending in the axial direction of the cylindrical expanded bead. From the standpoint of stable productivity, the expanded beads are in the form of a circular cylinder.

The $d_{MIN}/D_{MIN}$ ratio is 0.70 or less. When $d_{MIN}/D_{MIN}$ is excessively large, namely, when $d_{MIN}$ relative to $D_{MIN}$ is excessively large, the thickness of the resin part of the cylindrical expanded bead is so thin that it is difficult to secondarily expand the expanded beads in a stable manner. In this case, even if a high internal pressure is imparted to the multi-layered expanded beads, it is still difficult to obtain an expanded beads molded article in a stable manner, because the moldability and fusion bonding property of the expanded beads are deteriorated. For reasons that the cylindrical expanded beads have high strength and can give an expanded beads molded article free of shrinkage, $d_{MIN}/D_{MIN}$ is preferably 0.65 or less, still more preferably 0.60 or less.

The $d_{MIN}/D_{MIN}$ ratio is preferably 0.20 or more, still more preferably 0.30 or more, for reasons that it is difficult to obtain an expanded beads molded article having a high porosity when the throughhole diameter relative to outer diameter of the expanded bead is excessively small.

It is necessary that the minimum diameter $d_{MIN}$ of the throughhole of the multi-layered expanded bead as measured on a cross-section taken along a plane normal to the axial direction of the throughhole is 1.0 mm or more in order for the expanded beads (which have a $d_{MIN}/D_{MIN}$ ratio satisfying the equation (3)) to give an expanded beads molded article having a high porosity. When $d_{MIN}$ is excessively small, the throughhole diameter of the expanded bead is excessively small with the results that it is difficult to obtain an expanded beads molded article having a high porosity. From this point of view, the lower limit of $d_{MIN}$ is preferably 1.1 mm, more preferably 1.2 mm.

The upper limit of $d_{MIN}$ is preferably 3.5 mm, more preferably 3.3 mm, for reasons that the strength of the expanded bead is lowered when the throughhole diameter of the expanded bead is excessively large. As used herein, $d_{MIN}$ is the minimum diameter in mm of the throughhole as measured on an arbitrarily selected cross-section taken on a plane normal to the axial direction of the throughhole of the cylindrical expanded bead.

It is preferred that the apparent density of the multi-layered expanded beads be in such a relationship with a bulk density thereof as to meet the following equation (4):

$$40 \leq ((\text{apparent density} - \text{bulk density})/\text{apparent density}) \times 100 \leq 70 \qquad (4)$$

In the present specification, the term "voidage [%]" of the multi-layered expanded beads is defined, in terms of the relationship between their apparent density and bulk density, as "((apparent density−bulk density)/apparent density)×100".

The voidage of the multi-layered expanded beads is a value related to the void spaces that are formed in the multi-layered expanded beads when they are filled in a mold cavity.

As used herein, the bulk density of the multi-layered expanded beads is measured by the following method. Expanded beads just before being subjected to molding are filled in an empty graduated cylinder up to the 1 L mark in a natural state at 23° C. and a relative humidity of 50% under ambient pressure while removing static electricity. The weight of the expanded beads contained in the graduated cylinder is measured for determining the bulk density.

In the production process of the present invention, it is preferred that the in-mold molding be carried out using steam having a lower molding vapor pressure than that of the minimum molding vapor pressure used for molding cylindrical, single-layered expanded beads formed of the same base resin as that forming the expanded core layer of the multi-layered expanded beads. According to the present invention, even when the multi-layered expanded beads placed in a mold cavity are heated with steam having such a low molding vapor pressure, it is possible to secondarily expand and fuse-bond the expanded beads together while maintaining the void spaces (namely voidage) of the expanded beads filled in the mold cavity unchanged and while ensuring high fusion bonding strength between the expanded beads. Therefore, it is possible to obtain an expanded beads molded article having excellent fusion bonding and excellent bending deflection characteristics. Accordingly, the higher the voidage of the multi-layered expanded beads, the higher the porosity of the finally obtained expanded beads molded article can be made.

When the voidage falls with the above-described range, it is possible to easily obtain an expanded beads molded article which has a high porosity and excellent bending deflection characteristics. When the voidage is excessively low, it is necessary to further reduce the molding vapor pressure in order to maintain the porosity of the expanded beads molded article. This may cause a reduction of the fusion bonding strength. When the voidage is excessively high, on the other hand, there is a fear that the fusion bonding strength may be considerably reduced and the filling efficiency of the expanded beads in the mold cavity may be deteriorated because the contact areas between expanded beads considerably decrease. From the above viewpoints, the lower limit of the voidage is preferably 45%, while the upper limit of the voidage is preferably 60%.

In the production process of the present invention, it is particularly preferred that the in-mold molding be carried out in such a manner that a difference between the voidage of the multi-layered expanded beads and the porosity of the expanded beads molded article obtained therefrom is small for reasons that the porosity of the expanded beads molded article may be maintained at a high level. In particular, the difference between the voidage of the multi-layered expanded beads and the porosity of the expanded beads molded article (voidage of the multi-layered expanded beads minus porosity of the expanded beads molded article) is 20 or less.

According to the production process of the present invention, it is possible to perform the in-mold molding using a wide range of the molding vapor pressure. It is also possible to heat and fuse-bond the multi-layered expanded beads placed in a mold cavity by feeding steam having a lower molding vapor pressure than that of the minimum molding vapor pressure used for molding cylindrical, single-layered expanded beads formed of the same base resin as that of the expanded core layer of the multi-layered expanded beads.

Such a low molding vapor pressure condition may be adopted because the melting point Ts (° C.) of the resin forming the outer layer of the multi-layered expanded beads used in the present invention is lower than the melting point Tc (° C.) of the resin forming the expanded core layer. In particular, by performing the in-mold molding of the multi-layered expanded beads using a low molding vapor pressure as described above, it is possible to sufficiently fuse-bond the multi-layered expanded beads without a problem of excessive reduction of void spaces within the expanded beads molded article during the in-mold molding. As a consequence, the obtained expanded beads molded article has excellent bending deflection characteristics.

Further, when the in-mold molding is carried out under such a low molding vapor pressure as described above, the void spaces formed in the expanded beads placed in a mold cavity are maintained as such in the resulting expanded beads molded article. Therefore, steam can uniformly pass through the mold cavity with the results that the entire expanded beads molded article is uniformly heated with an improved production stability, and the quality of the obtained expanded beads molded article has improved stability. More specifically, the obtained expanded beads molded article is almost free of parts in which the bending deflection characteristics are locally deteriorated. Thus, the production stability and the bending deflection characteristics of the whole expanded beads molded article are improved.

As used herein, the phrase "the minimum molding vapor pressure used for molding cylindrical, single-layered expanded beads formed of the same base resin as that of the expanded core layer of the multi-layered expanded beads" refers to the lowest molding vapor pressure at and above which a good expanded beads molded article that satisfies the hereinafter described equations (8) and (9) is obtainable when cylindrical, single-layered expanded beads which are formed of the same base resin as that of the expanded core layer of the multi-layered expanded beads and which have the same or almost the same expansion ratio, diameter (of the expanded beads), cylindrical shape (of the expanded beads) and high temperature peak calorific value (of the expanded beads) as those of the expanded core layer of the multi-layered expanded beads according to the present invention, are molded in a mold cavity. Such cylindrical, single-layered expanded beads are referred to in the present specification as "single-layered expanded beads corresponding to the multi-layered expanded beads".

It is further preferred that the molding vapor pressure used in the in-mold molding the multi-layered expanded beads according to the present invention be 0.3 MPa(G) or less. Here, 0.3 MPa(G) indicates a gauge pressure value. The vapor pressure within the above range is not beyond the pressure resisting performance of general molding devices conventionally used for molding propylene-based resin expanded beads. Additionally, such a vapor pressure range makes it possible to produce with ease an expanded beads molded article that is generally susceptible to cause shrinkage and is difficult to be produced, for example an expanded beads molded article having a much low bulk density or having a much complicated shape. From the above viewpoint, the vapor pressure is preferably 0.2 MPa(G) or less. When the vapor pressure is 0.2 MPa(G) or less, the above-described Tc is preferably 150° C. or less. Meanwhile, the lower limit of the molding vapor pressure is not specifically limited as long as the desired fusion bonding strength is obtainable. In the case of expanded beads formed of a polypropylene-based resin, for example, the lower limit is generally 0.1 MPa(G).

When the polyolefin-based resin is a polylpropylene-based resin, it is preferred that the polypropylene-based resin forming the expanded core layer have a melt flow rate (MFR) of 0.1 to 30 g/10 min. When the MFR is within the above range, it is possible to prevent insufficient kneading of the resin which would otherwise be caused as a result of an excessive load exerted on an extruder during the preparation of resin particles and to prevent open cell formation which would otherwise be caused by a reduction of the tensile strength of the molten resin. Thus, expanded beads that can give an expanded beads molded article according to the present invention can be easily produced when the MFR is within the above range.

From the above viewpoint, the lower limit of the MFR is preferably 0.5 g/10 min, more preferably 1.0 g/10 min, while the upper limit thereof is preferably 25 g/10 min, more preferably 20 g/10 min. It is also preferred that the melt flow rate (MFR) of the resin forming the outer layer be about the same as that of the expanded core layer, since there is a fear that the outer layer is apt to be separated the from the expanded core layer when there is a significant difference in melt flow rate between them. In particular, the MFR of the resin of the outer layer is preferably 0.1 to 30 g/10 min. The lower limit of the MFR of the resin of the outer layer is preferably 0.5 g/10, more preferably 1.0 g/10 min, while the upper limit thereof is preferably 25 g/10 min, more preferably 20 g/10 min.

When the polyolefin-based resin is a polyethylene-based resin, it is preferred that the polyethylene-based resin forming the expanded core layer have a melt flow rate (MFR) of 0.1 to 20 g/10 min for the same reasons as in the case of the polypropylene-based resin. The lower limit of the MFR is preferably 0.5 g/10, more preferably 1.0 g/10 min, while the upper limit thereof is preferably 15 g/10 min, more preferably 10 g/10 min. The melt flow rate (MFR) of the resin forming the outer layer is preferably about the same as that of the expanded core layer and is preferably 0.1 to 20 g/10 min.

As used herein, the melt flow rate (MFR) is measured according to test condition M (temperature: 230° C., load: 2.16 kg) of JIS K 7210 (1999) in the case of polypropylene-based resins and according to test condition D (temperature: 190° C., load: 2.16 kg) of JIS K 7210 (1999) in the case of polyethylene-based resins.

In a case where the polyolefin-based resin forming the expanded core layer of the multi-layered expanded beads used in the present invention is a polypropylene-based resin, the bending modulus Mc (MPa) of the polypropylene-based resin is preferably 1,300 MPa or less, namely preferably satisfies the equation (5) shown below.

$$Mc \leq 1300 \text{ (MPa)} \tag{5}$$

When the bending modulus of the polypropylene-based resin falls within the above range, such secondary expansion properties as to give sufficient fusion bonding strength may be achieved. Accordingly, it is possible to obtain an expanded beads molded article having high fusion bonding strength and excellent bending deflection characteristics even with a low molding vapor pressure.

The bending modulus is more preferably 1,100 MPa or less, still more preferably 1,000 MPa or less. The lower limit of the bending modulus is generally 500 MPa.

Similarly, in a case where the polyolefin-based resin forming the expanded core layer is a polyethylene-based resin, the upper limit of the bending modulus (MPa) of the polyethylene-based resin is preferably 500 MPa or less, while the lower limit is generally 200 MPa.

It is further preferred that the difference between the bending modulus Mc (MPa) of the polyolefin-based resin forming the expanded core layer and the bending modulus Ms (MPa) of the polyolefin-based resin constituting the outer layer is preferably 600 MPa or less, namely preferably satisfies the following equation (6) (with the proviso that the difference between Mc and Ms is 0 MPa or more):

$$Mc - Ms \leq 600 \text{ (MPa)} \tag{6}$$

When the difference in bending modulus (Mc−Ms) falls within the above range, separation of the outer layer from the expanded core layer hardly takes place. Accordingly, it is possible to obtain an expanded beads molded article having high fusion bonding strength and excellent bending deflection characteristics even with a low molding vapor pressure. From the above point of view, the difference in bending modulus (Mc–Ms) is preferably 500 MPa or less. The lower limit of the difference in bending modulus is preferably 50 MPa.

As used herein, the bending modulus is measured according to the method specified in JIS K7171(1994).

In the multi-layered expanded beads used in the present invention, the weight ratio (ratio of weight %) of the resin forming the expanded core layer to the resin forming the outer layer is 99.5:0.5 to 80:20, more preferably 99:1 to 80:20, still more preferably 96:4 to 90:10. When the weight ratio of the resin forming the expanded core layer to the resin forming the outer layer falls within the above range, there are caused no problems such as difficulty in obtaining an improvement of fusion bonding due to excessive thinning of the outer layer thickness, and deterioration of the mechanical properties of the expanded beads molded article due to excessive increase of the relative proportion of the outer layer in the expanded bead.

The thickness of the outer layer of the multi-layered expanded beads is desired to be thin, because cells are hard to be formed in the outer layer when multi-layered resin particles are expanded. The thickness of the outer layer of the multi-layered expanded beads is co-related with the above-described weight ratio of the expanded core layer and the outer layer. When the thickness of the outer layer is excessively low, not only the effect of improving fusion bonding between the multi-layered expanded beads is adversely affected, but also it becomes difficult per se to sufficiently cover the expanded core layer therewith. Therefore, the thickness of the outer layer of the precursor multi-layered resin particles before expansion is preferably 5 to 500 µm, more preferably 10 to 100 µm. The thickness of the outer layer of the expanded beads obtained from the multi-layered resin particles or the outer layer of the expanded beads forming an expanded beads molded article is preferably 0.1 to 200 µm, more preferably 0.5 to 50 µm. The outer layer is preferably in a non-expanded state.

It is preferred that the multi-layered expanded beads have an average weight per bead of 0.1 to 5.0 mg, more preferably 0.3 to 2.0 mg, still more preferably 0.5 to 1.8 mg. When the average weight falls within the above range, it is possible to obtain an expanded beads molded article having a complicated shape because the expanded beads can be smoothly filled in a mold cavity. According to the process of the present invention, even when the multi-layered expanded beads are small in bead weight, it is possible to suppress shrinkage of an expanded beads molded article because the expanded beads can be molded in a mold cavity using a lower molding vapor pressure than conventionally employed. Additionally, a molded article having a much complicated shape may be obtained in a stable manner. The average weight is particularly preferably 1.6 mg or less because of capability of obtaining a molded article having a complicated shape.

The average weight of the expanded beads may be adjusted to a desired weight by controlling the average weight per particle of the resin particles from which the expanded beads are produced. The average weight of the expanded beads as used herein is a value calculated by dividing the weight (mg) of 200 expanded beads, chosen at random, by 200.

In the process of the present invention, the in-mold molding may be carried out using expanded beads which have been previously treated for increasing the inside pressure thereof. Such a treatment may be performed by charging expanded beads (which have been subjected to a customarily employed aging treatment under an atmospheric pressure) in a closed vessel capable of being pressurized, and pressurizing the beads with a pressurized gas such as air to increase the pressure inside the expanded beads (hereinafter occasionally referred to as "inside pressure of the expanded beads"). However, since the multi-layered expanded beads used in the present invention have excellent fusion bonding property, it is possible to obtain an expanded beads molded article having a high fusion bonding strength and a low bulk density even when the inside pressure imparted to the expanded beads is lower than conventionally used.

More specifically, the inside pressure of the multi-layered expanded beads is preferably 0.15 MPa(G) or less (inclusive of 0 MPa(G)), more preferably 0.1 MPa(G) for reasons of prevention of a reduction of porosity of the expanded beads molded article. It is further preferred that the expanded beads aged in an atmospheric pressure as such be subjected to in-mold molding without imparting substantial inside pressure thereto.

The inside pressure (MPa(G)) imparted to the expanded beads may be determined by the following calculation:

$$P = (W/M) \times R \times T/V$$

wherein W (g) is a difference between the weight Q (g) of the expanded beads whose inside pressure has been increased and which are just before being subjected to in-mold molding and the weight U (g) of the expanded beads which have been allowed to stand for 48 hours, M is the molecular weight of air, R is the gas constant, T represents an absolute temperature, and V represents a volume (L) obtained by subtracting the volume of the base resin of a group of the expanded beads from the apparent volume of the group of the expanded beads.

In the process for producing a polyolefin-based resin expanded beads molded article, the above-described multi-layered expanded beads are filled in a mold cavity. Steam is then introduced into the mold cavity to heat and fuse-bond the multi-layered expanded beads in the mold cavity, thereby obtaining the polyolefin-based resin expanded beads molded article.

Any conventionally known method may be adopted as an in-mold molding method employed in the process of the present invention. There may be mentioned, for example, a reduced pressure molding method (disclosed, for example, in JP-S46-38359-B) in which a pair of molds that are configured to mold expanded beads in a mold cavity defined therebetween are used. After the expanded beads have been filled, under an atmospheric pressure or a reduced pressure, in the mold cavity, the molds are closed to reduce the volume of the mold cavity by 5 to 70% so that the expanded beads are compressed and, thereafter, a heating medium such as steam is fed to the mold cavity to heat and fuse-bond the expanded beads. Alternatively, there may be adopted a compression filling molding method (disclosed, for example, in JP-H04-46217-B) in which, into a mold cavity that has been pressurized with a compression gas to a cavity pressure higher than an atmospheric pressure, expanded beads that have been compressed to a pressure higher than the cavity pressure are filled, and a heating medium such as steam is then fed to the mold cavity to heat and fuse-bond the expanded beads. in an ordinary mold for use in in-mold molding of thermoplastic resin expanded beads which is adapted to be heated and cooled and to be opened and closed. In the production process of the present invention, however, it is preferable to carry out the in-mold molding in such a manner that the expanded beads are filled in a mold cavity so as to form a space between the expanded beads.

Described next is a method for preparing the multi-layered expanded beads used for the production process of the present invention. The multi-layered expanded beads may be prepared by expanding multi-layered resin particles each of which has a core layer formed of a polyolefin-based resin having a melting point Tc (° C.) and an outer layer formed of a polyolefin-based resin having a lower melting point Ts (° C.) than the melting point Tc, in a manner as described hereinafter.

For example, the multi-layered resin particles may be obtained by a method in which a device having two extruders, i.e. an extruder for forming a core layer and an extruder for forming an outer layer are connected to a coextrusion die, is used. In this method, a polyolefin-based resin for forming the core layer and, if needed, additives are fed to the extruder for forming a core layer and melted and kneaded, while another polyolefin-based resin and, if needed, additives are fed to the extruder for forming an outer layer and melted and kneaded. The respective molten kneaded masses thus obtained are combined in the die to form core-sheath type composite bodies each having a cylindrical core layer in a non-expanded state and an outer layer in a non-expanded state that covers an exterior surface of the core layer. The composite bodies are then extruded in the form of strands through small holes of a mouthpiece attached to a die exit at a tip of the extruder and then cut with a pelletizer such that the resin particles obtained each have a specific weight, whereby multi-layered resin particles each having a cylindrical, polyolefin-based resin core layer and a polyolefin-based resin outer layer covering the core layer are obtained.

The multi-layered expanded beads used in the production process of the present invention may be obtained by, for example, expanding the above-described multi-layered resin particles in the following manner.

The multi-layered resin particles having a core layer and an outer layer are dispersed in an aqueous medium, such as water or an alcohol, contained in a closed vessel such as autoclave. The aqueous medium is then heated to a temperature not lower than the softening point of the polyolefin-based resin forming the core layer. A blowing agent is thereafter injected into the closed vessel to impregnate the multi-layered resin particles with the blowing agent. While maintaining the pressure inside the closed vessel at a pressure not lower than the vapor pressure of the blowing agent, an end portion of the closed vessel that is located beneath the water level is opened to release the multi-layered resin particles together with the aqueous medium from the closed vessel to an atmosphere which is maintained at a pressure lower than that in the vessel (this method is hereinafter referred to as "dispersing medium releasing expansion method"). The multi-layered resin particles are expanded by the above method to obtain the multi-layered expanded beads. From the standpoint of easiness in handling, water is generally preferably used as the aqueous medium.

In the above-described dispersing medium releasing expansion method, it is preferable to add a dispersing agent to the dispersing medium in order to prevent the fusion bonding between the multi-layered resin particles during the heating in the closed vessel. As the dispersing agent, there may be used any substance which may prevent fusion bonding between the multi-layered resin particles. An organic or inorganic dispersing agent may be used. Preferably used is an inorganic fine powder for reasons of easiness in handling. Examples of the dispersing agent include natural or synthetic claim mineral, such as amsnite, kaolin, talc, mica or clay, aluminum oxide, titanium oxide, basic magnesium carbonate, basic zinc carbonate, calcium carbonate and iron oxide. These substances may be used singly or in combination of two or more thereof. The amount of the dispersing agent is generally 0.001 to 5 parts by weight per 100 parts by weight of the multi-layered resin particles.

Further, in the above-described dispersing medium releasing expansion method, a dispersion enhancing agent which enhances the dispersing power of the dispersing agent (which has a function to prevent fusion bonding between the multi-layered resin particles in the vessel even when the amount of the dispersing agent is small) may be added to the dispersing medium. As the dispersion enhancing agent, there may be mentioned an inorganic compound which is soluble in 100 mL of water at 40° C. in an amount of at least 1 mg. Such an inorganic compound is preferably an inorganic substance containing an anion and a cation at least one of which is divalent or trivalent. Examples of the inorganic substance include magnesium chloride, magnesium nitrate, magnesium sulfate, aluminum chloride, aluminum nitrate, aluminum sulfate, iron chloride, iron sulfate and iron nitrate. The dispersion enhancing agent is generally used in an amount of 0.0001 to 1 part by weight per 100 parts by weight of the multi-layered resin particles.

Examples of the blowing agent include organic physical blowing agents such as aliphatic hydrocarbons, e.g. propane, butane, hexane and heptane, alicyclic hydrocarbons, e.g. cyclobutane and cyclopentane and halogenated hydrocarbons, e.g. chlorofluoromethane, trifluoromethane, 1,2-difluoroethane, 1,2,2,2-tetrafluoroethane, methylchloride, ethylchloride and methylene chloride; and inorganic physical blowing agents such as nitrogen, oxygen, air, carbon dioxide and water. The inorganic blowing agent may be used in combination with the organic blowing. Among the above physical blowing agents, a blowing agent containing as its primary component one or two or more inorganic physical blowing agents selected from nitrogen, oxygen, air, carbon dioxide and water is preferred. Among them, carbon dioxide, nitrogen and air are particularly preferred from the viewpoint of stability in apparent density of the expanded beads, environmental load and costs. When water is used as the blowing agent, the water used as a dispersing medium for dispersing therein the multi-layered resin particles within the closed vessel may be utilized as such.

The amount of the physical blowing agent charged in the vessel employed in the above-described dispersing medium releasing expansion method is determined as appropriate in consideration of the kind thereof, the expansion temperature and the desired apparent density of the expanded beads. More specifically, when carbon dioxide is used as the blowing agent and water is used as the dispersing medium, it is preferable to use the physical blowing agent in an amount so that the pressure (namely gauge pressure in the space inside the closed vessel) within the closed vessel in a stable state just before the start of the expansion is 0.6 to 6 MPa(G). In general, it is preferred that the lower the apparent density of the desired expanded beads, the higher the pressure of the space in the vessel. It is thus desired that the higher the apparent density of the desired expanded beads, the lower the pressure of the space in the vessel.

In the above-described dispersing medium releasing expansion method, the physical blowing agent may be charged in the vessel simultaneously with the start of the temperature rise, during the temperature raising or just before the start of the expansion at which the conditions have been stabilized.

In the above-described dispersing medium releasing expansion method, the calorific value of the high temperature peak of the multi-layered expanded beads may be controlled by, for example, the following method. The multi-layered resin particles dispersed in the aqueous medium are first heated to a temperature not higher than the melting completion temperature (Tce) of the polyolefin-based resin forming the core layer thereof. In this case, the heating is stopped at an arbitrary temperature (Ta) which is higher than the melting temperature (Tc) minus 20° C. of the resin but is lower than the melting completion temperature (Tce). The expanded beads are then maintained at that temperature (Ta) for a sufficient time, preferably about 10 to 60 minutes. Thereafter, the temperature is raised to an arbitrary temperature (Tb) which is higher than the melting point (Tc) minus 15° C. but is not higher than the melting completion temperature (Tce) plus 10° C. The multi-layered resin beads are maintained at that temperature (Tb) for a sufficient time, preferably about 10 to 60 minutes, and then released from the closed vessel to a low pressure atmosphere to allow them to foam and expand. As used herein the melting completion temperature (Tce) is determined as a temperature T of an intersection at which the DSC curve on a high temperature side of the high temperature peak "B" meets the base line on the high temperature side.

The temperatures Ta and Tb and the retention time are specified as described above in the above-described dispersing medium releasing expansion method, because the magnitude of the high temperature peak of the expanded beads depends upon the temperature Ta, retention time at the temperature Ta, temperature Tb, retention time at the temperature Tb and heating rate in the production of the expanded beads.

In general, as the temperature Ta or Tb decreases within the above-described temperature range, or as the retention time increases, the calorific value of the high temperature peak of the expanded beads tends to increase. The above-described expansion process generally uses a heating rate of 0.5° C. to 5° C./min. As the heating rate decreases, the calorific value of the high temperature peak tends to increase. Thus, the production conditions suited for producing the expanded beads showing the desired calorific value of the high temperature peak may be easily and accurately determined by repeating preliminary experiments while taking the above points in consideration.

The above-described temperature range to which the resin particles are adjusted in the expansion stage is a temperature range suited when an inorganic physical blowing agent is used. If the inorganic blowing agent is used in combination with an organic physical blowing agent, the suitable temperature range will tend to shift to the low temperature side from the above-described the temperature range for the inorganic physical blowing agent, depending upon the type or using amount of the blowing agent.

The method for expanding the multi-layered resin particles impregnated with a blowing agent is not limited only to the above-described dispersing medium releasing expansion method. For example, there may be used a method in which expandable multi-layered resin particles impregnated with a blowing agent are expanded using a heating medium such as heating steam or hot wind as disclosed in JP-H04-372630-A.

The multi-layered expanded beads used in the present invention may be preferably produced by the above-described methods. The obtained multi-layered expanded beads each have a multi-layered structure that has an expanded core layer in an expanded state and an outer layer covering a surface of the core layer. The outer layer is formed of a polyolefin-based resin having a lower melting point than that of a polyolefin-based resin forming the core layer.

The apparent density of the multi-layered expanded beads may be controlled with a range of 10 to 200 g/L by adjusting the amount of the blowing agent and the expansion temperature.

The expanded beads molded article of the present invention will be next described. Hitherto, when the single-layered expanded beads corresponding to the multi-layered expanded beads are molded in a mold cavity, it is necessary to sufficiently heat and fuse-bond the expanded beads to each other in order to obtain a sufficient fusion bonding strength. In this case, the expanded beads undergo secondarily expansion beyond necessary by the heating. As a result, the cylindrical portions of the cylindrical expanded beads are crushed so that the porosity of the expanded beads molded article tends to decrease. When the in-mold molding is carried out with a low molding vapor pressure so as to obtain an expanded beads molded article having a higher porosity, on the other hand, the secondary expansion of the expanded beads is excessively suppressed so that the fusion bonding between the expanded beads tends to be insufficient although the porosity of the molded article may be maintained at a high level. Therefore, the conventional technology has a problem to be solved with respect to production of an expanded beads molded article having excellent bending deflection characteristics, a high porosity, a high bulk density and a light weight.

The expanded beads molded article of the present invention is a polyolefin-based resin expanded beads molded article that has a bulk density of 10 to 100 g/L and that is obtainable by molding, in a mold cavity, expanded beads each of which has a cylindrical, polyolefin-based resin expanded core layer and a polyolefin-based resin outer layer covering the expanded core layer, and which satisfies the equation (7) shown below, $$Tc(° C.) > Ts(° C.) \qquad (7)$$

wherein Tc represents a melting point of the polyolefin-based resin forming the expanded core layer and Ts represents a melting point of the polyolefin-based resin forming the outer layer.

When the multi-layered expanded beads that satisfy the above requirements are molded in a mold cavity, the resulting expanded beads molded article has excellent bending deflection characteristics because the fusion bonding between the expanded beads is improved by the function of the polyolefin-based resin forming the outer layer.

Further, the expanded beads molded article of the present invention has a porosity of 20% or higher and less than 50% and a maximum bending deflection Y, in mm, which satisfies the following equations (8) and (9):

$$Y \geq 5 \qquad (8)$$

$$Y \geq -0.2X + 20 \qquad (9)$$

wherein Y represents the maximum bending deflection in mm as measured by a bending test method according to JIS K7221-2 (1999) and X represents a bulk density in g/L of the polyolefin-based resin expanded beads molded article.

Because the expanded beads molded article of the present invention satisfies the above equation (8) and has a maximum bending deflection of 5 mm or more, bending failure (fracture) does not easily occur. Thus, the molded article, when subjected to a load, is not broken at an early stage of the load application. Further, the molded article has improved impact energy absorbing property, improved sound absorbing property and improved construction efficiency as a construction material. From the viewpoint of durability, the maximum bending deflection is preferably 10 mm or more, more preferably 15 mm or more. The expanded beads molded article having such maximum bending deflection is suited as a height increasing material or as a rib-bearing expanded beads molded article.

Further, the expanded beads molded article of the present invention, whose maximum bending deflection satisfies the above equation (9), can withstand actual use as a drainage material, a wall material for buildings, an interior material for automobiles, etc. in which the expanded beads molded article must have a sufficient fusion bonding strength in correspondence with its bulk density. From this point of view, the maximum bending deflection preferably satisfies the following equation (10):

$$Y \geq -0.2X + 25 \quad (10)$$

As the maximum bending deflection of the expanded beads molded article increases, the fusion bonding strength between the expanded beads tends to increase. The maximum bending deflection of the expanded beads molded article also depends on its bulk density, i.e. there is a tendency that the higher the bulk density, the lower the maximum bending deflection. The expanded beads molded article of the present invention, which has such a fusion bonding strength that meets the above equation (9), has excellent bending deflection characteristics.

The maximum bending deflection of the expanded beads molded article of the present invention may be measured by the method specified in JIS K7221-2 (1999) and means an amount of bending deflection at which the test piece is broken.

The expanded beads molded article of the present invention has a bulk density of 10 to 100 g/L. When the bulk density is less than 10 g/L, there is a fear that the mechanical strengths such as compressive strength and tensile strength are excessively deteriorated. Too large a bulk density in excess of 100 g/L, on the other hand, adversely affects lightness in weight and may cause deterioration of bending deflection characteristics. From such points of view, the upper limit of the bulk density is preferably 75 g/L, more preferably 60 g/L still more preferably 45 g/L, while the lower limit is preferably 12 g/L, more preferably 15 g/L. As used herein, the bulk density of the expanded beads molded article is a value calculated by dividing the weight (g) of the expanded beads molded article by the volume (L) of the expanded beads molded article which is determined from the external dimension thereof.

The expanded beads molded article of the present invention has a porosity of 20% or more and less than 50%. When the porosity is excessively low, there is a fear that the properties such as water-permeability, air-permeability and sound absorbing property are deteriorated. On the other hand, too high a porosity may cause deterioration of mechanical strengths such as bending deflection characteristics, compressive strength and tensile strength are deteriorated. From the above points of view, the porosity is preferably 25 to 45%.

In the present invention, the porosity of the expanded beads molded article is calculated by the following equation (11):

$$\text{Porosity (\%)} = [(H-I)/H] \times 100 \quad (11)$$

wherein H is a volume (cm$^3$) determined from the external dimension of the expanded beads molded article (for example, a sample of 20 mm×15 mm×80 mm (surfaces are all cut surfaces) and I is a volume (cm$^3$) of the expanded beads molded article except for its void space. The volume I is a volume of the expanded beads molded article except for its void spaces, which may be determined from an increase of the volume of an alcohol (ethanol for example) when the expanded beads molded article is immersed therein.

Further, the expanded beads molded article of the present invention, when measured by heat flux differential scanning calorimetry in which 2 to 10 mg thereof are heated from 23° C. to 220° C. at a heating speed of 10° C./min, give a DSC curve (first time heating DSC curve) having an intrinsic endothermic peak "C" (hereinafter occasionally referred to as intrinsic peak) and one or more endothermic peaks "D" (hereinafter occasionally referred to as high temperature peak) which are located on a higher temperature side of the endothermic peak and which have a heat of fusion of 50 J/g or less.

Because of the constitution described above, the multi-layered expanded beads can secondarily expand in the in-mold molding stage while preventing a reduction of bore spaces and attaining such a fusion bonding strength as to provide excellent bending deflection characteristics. Therefore, the obtained molded article has sufficiently high fusion bonding strength, excellent bending deflection characteristics and a low bulk density. When the calorific value of the high temperature peak is excessively high, the secondary expansion of the expanded beads is excessively suppressed in the in-mold molding stage, so that the fusion bonding between the expanded beads tends to be insufficient. As a consequence, the bending deflection characteristics of the expanded beads molded article tend to be deteriorated. The calorific value of the high temperature peak is preferably 2 to 40 J/g, more preferably 3 to 30 J/g, still more preferably 5 to 20 J/g.

The above-described heat of fusion of the expanded beads molded article of the present invention may be measured in the same manner as that of the above-described multi-layered expanded beads except for using a test piece that is cut out from a center region of the expanded beads molded article. Incidentally, the heat of fusion of the high temperature peak is almost the same before and after in-mold molding. Thus, when the heat of fusion of the high temperature peak of the expanded beads is 50 J/g or less, the heat of fusion of the high temperature peak of the expanded beads molded article obtained therefrom is also 50 J/g or less.

The expanded beads molded article of the present invention is low in bulk density and light in weight and has a high porosity and excellent bending deflection characteristics, which have never been conventionally achieved.

Example 1

The present invention will be described in more detail by way of examples and comparative examples.

Raw material polyolefin-based resins used in the examples and comparative examples are shown in Table 1.

TABLE 1

|  | Abbreviation | Catalyst Species | Type of Resin | MFR (g/10 min) | Bending modulus (MPa) |
|---|---|---|---|---|---|
| Polyolefin-based resin (raw material resin) | Resin 1 | Metallocene system | Propylene-ethylene random copolymer | 7 | 700 |
|  | Resin 2 | Ziegler system | Propylene-ethylene-butene random copolymer | 8 | 850 |
|  | Resin 3 | Ziegler system | Propylene-ethylene random copolymer | 5 | 950 |
|  | Resin 4 | Ziegler system | Propylene-ethylene random copolymer | 8 | 1,200 |
|  | Resin 5 | Ziegler system | Propylene homopolymer | 10 | 1,600 |

Examples 1 to 10

An extrusion device having an extruder (inside diameter: 65 mm) for forming a core layer, an extruder (inside diameter: 30 mm) for forming an outer layer and a die for forming multi-layered strands which was attached to exits of the two extruders was used. The polyolefin-based resins shown in Table 2 for forming a core layer and an outer layer were fed to respective extruders and melted and kneaded to obtain molten and kneaded masses. The molten kneaded masses were introduced into the die for forming multi-layered strands, combined in the die and then extruded in the form of cylindrical strands through small holes of a mouthpiece attached to a die exit. Each of the cylindrical strands had a two-layer structure consisting of a core layer and an outer layer (core-sheath form), with a throughhole provided in the core layer (ratio of the core layer (wt %) to the outer layer (wt %) was 95:5). The extruded strands were cooled with water and then cut with a pelletizer into particles each having a weight shown in Table 2. Drying of the cut particles gave cylindrical multi-layered resin particles. The resins forming the obtained resin particles, the physical properties of the expanded particles and other properties thereof are summarized in Table 2.

The polyolefin-based resins for forming the core layers are each fed in the form of a master batch that contained 1,000 ppm by weight of zinc borate as a cell controlling agent.

The obtained multi-layered resin particles (800 g) were charged in a 5 L closed vessel together with 3 L of water as a dispersing medium, to which 0.3 part by weight of kaolin as a dispersing agent, 0.4 part by weight (as effective amount) of a surfactant (sodium alkylbenzenesulfonate, Trade name: Neogen, manufactured by Dai-ichi Kogyou Seiyaku Co., Ltd.) and 0.01 part of aluminum sulfate were added. Carbon dioxide as a blowing agent was then injected into the closed vessel in an amount shown in Table 2. The contents were heated with stirring until a temperature lower by 5° C. than the foaming temperature shown in Table 2 was reached and then maintained at the foaming temperature minus 5° C. for 15 minutes to adjust the calorific value of the high temperature peak.

After having been heated to the foaming temperature shown in Table 2, the contents were allowed to stand at that temperature for another 15 minutes and then released to atmospheric pressure together with water to obtain multi-layered expanded beads having an apparent density as shown in Table 2. The physical properties, etc. of the obtained multi-layered expanded beads are shown in Table 2. In Example 9, a two-stage expansion method was adopted. Thus, expanded beads having an apparent density of 30 g/L were first produced and subjected to a customarily employed aging treatment under atmospheric pressure. The expanded beads were then filled in another closed vessel, pressurized and then heated with steam to obtain multi-layered expanded beads having an apparent density of 19 g/L. The physical properties of the obtained multi-layered expanded beads are shown in Table 2.

The thus obtained multi-layered expanded beads were optionally subjected to a pressurization treatment for increasing the pressure inside the expanded beads using a pressurized gas (air) under the conditions shown in Table 2. The multi-layered expanded beads were placed between molds for forming a flat plate having a length of 250 mm, a width of 200 mm and a thickness of 50 mm and subjected to an in-mold molding process by heating with steam to obtain expanded beads-molded articles each in the form of a plate. The heating was performed as follows. Steam was fed for 5 seconds for preheating (purging step) in such a state that drain valves on both sides of the molds were maintained in open state. Thereafter, one-direction flow heating was carried out using steam having a pressure lower by 0.08 MPa(G) than the molding vapor pressure shown in Table 2, followed by reversed one-direction flow heating using steam having a pressure lower by 0.04 MPa(G) than the molding vapor pressure shown in Table 2. Finally, substantial heating was carried out at the molding vapor pressure shown in Table 2 from both sides of the molds.

After completion of the heating, the pressure was released and air was fed for 30 seconds for cooling. Then, the molds were opened and the molded product was taken out of the mold cavity. This was aged in an oven at 80° C. for 12 hours to obtain a polyolefin-based resin expanded beads molded article. The physical properties of the thus obtained molded articles are shown in Table 2.

Comparative Examples 1 to 4

Multi-layered resin particles having physical properties shown in Table 3 were prepared in the same manner as that in Example 1 except that the resin shown in Table 1 was used and that the size of small holes of the mouthpiece attached to the die tip was changed. The multi-layered resin particles were expanded in the same manner as that in Example 1 except for using the conditions shown in Table 3. The obtained multi-layered expanded beads were then molded in the same manner as that in Example 1 except for using the conditions shown in Table 3 to obtain expanded beads molded articles whose physical properties are shown in Table 3.

Reference Examples 1 to 5

Only an extruder for forming a core layer was used. A polyolefin-based resin for forming the core layer shown in Table 3 was fed to the extruder, melted and kneaded to obtain molten and kneaded masses. The molten kneaded masses were introduced into a die and then extruded in the form of single-layered cylindrical strands through small holes of a mouthpiece attached to a die exit. The extruded strands were cooled with water and then cut with a pelletizer into particles each having a weight shown in Table 3. Drying of the cut particles gave cylindrical single-layered resin particles. The physical properties of the resin particles and other properties thereof are summarized in Table 3. Then expanded beads molded articles were prepared in the same manner as that in Example 1 except for using the conditions shown in Table 3. The obtained expanded beads molded articles had physical properties shown in Table 3. The molding vapor pressures used in Reference Examples 2 and 4 were adjusted to the minimum steam vapor pressures of the Resins 3 and 4, respectively.

TABLE 2

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Multi-layered resin particles | Outer layer | Raw material resin | resin1 | resin1 | resin2 | resin1 | resin1 | resin1 | resin1 | resin1 | resin1 | resin1 | resin1 |
| | | Melting point Ts (° C.) | 125 | 125 | 137 | 125 | 125 | 125 | 125 | 125 | 125 | 125 | 125 |
| | | Vicat softening point (° C.) | 110 | 110 | 127 | 110 | 110 | 110 | 110 | 110 | 110 | 110 | 110 |

TABLE 2-continued

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | Core layer | Raw material resin | resin3 | resin3 | resin3 | resin4 | resin3 | resin3 | resin3 | resin3 | resin3 | resin3 | resin5 |
| | | Melting point Tc (° C.) | 143 | 143 | 143 | 155 | 143 | 143 | 143 | 143 | 143 | 143 | 168 |
| | | Vicat softening point (° C.) | 132 | 132 | 132 | 148 | 132 | 132 | 132 | 132 | 132 | 132 | 159 |
| | Difference in melting point Tc-Ts *1 (° C.) | | 18 | 18 | 6 | 30 | 18 | 18 | 18 | 18 | 18 | 18 | 43 |
| | Difference in Vicut softening point *2 (° C.) | | 22 | 22 | 5 | 38 | 22 | 22 | 22 | 22 | 22 | 22 | 49 |
| | | dmin(mm) | 0.73 | 0.73 | 0.73 | 0.73 | 1.0 | 0.31 | 0.50 | 0.73 | 0.73 | 0.73 | 0.73 |
| | | Dmin(mm) | 1.4 | 1.4 | 1.4 | 1.4 | 1.5 | 1.3 | 1.0 | 1.4 | 1.4 | 1.4 | 1.4 |
| | | dmin/Dmin | 0.52 | 0.52 | 0.52 | 0.52 | 0.67 | 0.24 | 0.50 | 0.52 | 0.52 | 0.52 | 0.52 |
| | | Bending modulus of core layer Mc (MPa) | 950 | 950 | 950 | 1200 | 950 | 950 | 950 | 950 | 950 | 950 | 1600 |
| | | Difference in bending modulus Mc-Ms *3 (MPa) | 250 | 250 | 100 | 500 | 250 | 250 | 250 | 250 | 250 | 250 | 900 |
| Multi-layered ex-panded beads | Expansion conditions | Carbon dioxide (Mpa) | 4.0 | 4.0 | 4.0 | 3.3 | 3.6 | 4.0 | 4.0 | 2.2 | 4.0 | 2.7 | 2.2 |
| | | Expansion temperature (° C.) | 149 | 149 | 149 | 160 | 149 | 150 | 150 | 151 | 149 | 151 | 170 |
| | Physical properties | Average weight (mg) | 1.5 | 1.5 | 1.5 | 1.5 | 1.5 | 1.5 | 0.5 | 1.5 | 1.5 | 1.5 | 1.5 |
| | | dmin(mm) | 2.0 | 2.0 | 2.0 | 2.0 | 3.0 | 1.3 | 1.3 | 1.2 | 3.1 | 2.0 | 2.0 |
| | | Dmin(mm) | 3.9 | 3.9 | 3.9 | 3.9 | 4.5 | 3.9 | 2.7 | 2.0 | 6.0 | 3.7 | 3.9 |
| | | dmin/Dmin | 0.51 | 0.51 | 0.51 | 0.51 | 0.67 | 0.33 | 0.48 | 0.60 | 0.52 | 0.54 | 0.51 |
| | | Apparent density (g/L) | 55 | 55 | 55 | 55 | 63 | 46 | 50 | 170 | 19 | 100 | 55 |
| | | Bulk density (g/L) | 26 | 26 | 26 | 26 | 27 | 27 | 24 | 73 | 8 | 50 | 26 |
| | | Voidage (%) | 53 | 53 | 53 | 53 | 57 | 41 | 52 | 57 | 58 | 50 | 53 |
| | | High temperature peak calorific value (J/g) | 13 | 13 | 13 | 21 | 14 | 12 | 12 | 16 | 14 | 14 | 25 |
| Ex-panded beads molded article | Molding conditions | Molding valor pressure (MPa(G)) | 0.14 | 0.18 | 0.16 | 0.30 | 0.20 | 0.14 | 0.14 | 0.16 | 0.14 | 0.14 | 0.38 |
| | | Expanded beads inside pressure (MPa(G)) | 0 | 0 | 0 | 0 | 0 | 0 | 0 | 0 | 0.05 | 0 | 0 |
| | Physical properties | Bulk density X (g/L) | 30 | 30 | 30 | 30 | 30 | 30 | 30 | 80 | 11 | 60 | 30 |
| | | High temperature peak calorific value (J/g) | 13 | 13 | 13 | 21 | 14 | 12 | 12 | 16 | 14 | 14 | 25 |
| | | Porosity (%) | 40 | 35 | 37 | 38 | 49 | 28 | 38 | 48 | 45 | 40 | 42 |
| | | Maximum bending deflection Y (mm) | 25 | 28 | 26 | 22 | 16 | 28 | 25 | 7 | 27 | 14 | 15 |
| | | −02X + 20 | 14 | 14 | 14 | 14 | 14 | 14 | 14 | 4 | 18 | 8 | 14 |
| | | Evaluation of fusion bonding strength | A | A | A | A | B | A | A | B | A | A | B |

TABLE 3

| | | | Comparative Example | | | | Reference Example | | | |
|---|---|---|---|---|---|---|---|---|---|---|
| | | | 1 | 2 | 3 | 4 | 1 | 2 | 3 | 4 |
| Multi-layered resin particles | Outer layer | Raw material resin | resin1 | resin1 | resin1 | resin1 | — | — | — | — |
| | | Melting point Ts (° C.) | 125 | 125 | 125 | 125 | — | — | — | — |
| | | Vicat softening point (° C.) | 110 | 110 | 110 | 110 | — | — | — | — |
| | Core layer | Raw material resin | resin3 | resin3 | resin3 | resin5 | resin3 | resin3 | resin3 | resin4 |
| | | Melting point Tc (° C.) | 143 | 143 | 143 | 168 | 143 | 143 | 143 | 155 |
| | | Vicat softening point (° C.) | 132 | 132 | 132 | 159 | 132 | 132 | 132 | 148 |
| | Difference in melting point Tc-Ts *1 (° C.) | | 18 | 18 | 18 | 43 | — | — | — | — |
| | Difference in Vicut softening point *2 (° C.) | | 22 | 22 | 22 | 49 | — | — | — | — |
| | | dmin(mm) | 0.80 | 0.80 | 0.80 | 0.80 | 0.73 | 0.73 | 0.73 | 0.73 |
| | | Dmin(mm) | 1.0 | 1.0 | 1.0 | 1.4 | 1.4 | 1.4 | 1.4 | 1.4 |
| | | dmin/Dmin | 0.8 | 0.8 | 0.8 | 0.6 | 0.52 | 0.52 | 0.52 | 0.52 |
| | | Bending modulus of core layer Mc (MPa) | 950 | 950 | 950 | 1600 | 950 | 950 | 950 | 1200 |
| | | Difference in bending modulus Mc-Ms *3 (MPa) | 250 | 250 | 250 | 900 | — | — | — | — |
| Multi-layered expanded beads | Expansion conditions | Carbon dioxide (Mpa) | 3.2 | 2.8 | 2.2 | 2.4 | 4.0 | 4.0 | 4.0 | 3.3 |
| | | Expansion temperature (° C.) | 150 | 151 | 151 | 167 | 149 | 149 | 149 | 160 |
| | Physical properties | Average weight (mg) | 1.5 | 1.5 | 1.5 | 1.5 | 1.5 | 1.5 | 1.5 | 1.5 |
| | | dmin (mm) | 2.0 | 1.7 | 1.6 | 2.1 | 2.0 | 2.0 | 2.0 | 2.0 |
| | | Dmin(mm) | 2.5 | 2.2 | 1.9 | 4.0 | 3.9 | 3.9 | 3.9 | 3.9 |
| | | dmin/Dmin | 0.80 | 0.77 | 0.84 | 0.53 | 0.51 | 0.51 | 0.51 | 0.51 |
| | | Apparent density (g/L) | 102 | 150 | 250 | 55 | 55 | 55 | 55 | 55 |
| | | Bulk density (g/L) | 27 | 45 | 82 | 26 | 26 | 26 | 26 | 26 |
| | | Voidage (%) | 74 | 70 | 67 | 53 | 53 | 53 | 53 | 53 |
| | | High temperature peak calorific value (J/g) | 13 | 13 | 13 | 54 | 13 | 13 | 13 | 19 |

TABLE 3-continued

|  |  |  | Comparative Example | | | | Reference Example | | | |
|---|---|---|---|---|---|---|---|---|---|---|
|  |  |  | 1 | 2 | 3 | 4 | 1 | 2 | 3 | 4 |
| Expanded beads molded article | Expansion conditions | Molding valor pressure (MPa(G)) | 0.24 | 0.28 | 0.32 | 0.42 | 0.14 | 0.28 | 0.32 | 0.38 |
|  |  | Expanded beads inside pressure (MPa(G)) | 0 | 0 | 0 | 0.2 | 0 | 0 | 0 | 0 |
|  | Physical properties | Bulk density X (g/L) | 30 | 50 | 90 | 30 | 30 | 30 | 30 | 30 |
|  |  | High temperature peak calorific value (J/g) | 13 | 13 | 13 | 54 | 13 | 13 | 13 | 19 |
|  |  | Porosity (%) | 55 | 50 | 44 | 44 | 40 | 19 | 14 | 17 |
|  |  | Maximum bending deflection Y (mm) | 11 | 7 | 3 | 7 | 6 | 15 | 21 | 14 |
|  |  | −02X + 20 | 14 | 10 | 2 | 14 | 14 | 14 | 14 | 14 |
|  |  | Evaluation of fusion bonding strength | C | C | C | C | C | B | A | B |

Remarks of Tables 2 and 3:
*1: Difference in melting point between outer and core layers (° C.)
*2: Difference in Vicat softening point between outer and core layers (° C.)
*3: Difference in bending modulus between outer and core layers (MPa)

Method for measuring physical properties and method of evaluation are as follows.

The bending modulus was measured according to the method specified in JIS K7171(1994). A resin test piece having a thickness of 4 mm, a width of 10 mm and a length of 80 mm was placed in a thermostat chamber at 23° C., 50% humidity for over 24 hours and measured for its bending modulus by autograph AGS-10kNG (manufactured by Shimadzu Corporation) under conditions involving a span between fulcrums of 64 mm, an indenter radius of $R_1$ 5.0 mm, a fulcrum radius of $R_2$ 5.0 mm, a test speed of 2 mm/min, a chamber temperature of 23° C. and a humidity of 50%. An average of calculated values (at least 5 measured values) was used.

The Vicat softening point was measured according to JIS K7206 (1999), Method A50. In particular, a polyolefin-based resin was pressed at 230° C. and 5 MPa while preventing inclusion of air bubbles to obtain a test piece with a length of 20 mm, a width of 20 mm and a thickness of 3 mm. The test piece was measured, without annealing treatment, using HDT/VSPT tester (Model TM-4123) manufactured by Ueshima Seisakusho Co., Ltd.

The inside pressure imparted to the expanded beads was measured as follows. A group of expanded beads, whose inside pressure had been increased and which were just before the in-mold molding, were taken out of a pressure tank. Within 60 seconds after they had been taken out of the pressurized tank, the expanded beads were packed in a bag having a size of 70 mm×100 mm and provided with a multiplicity of pin holes each having such a size that prevents the passage of the beads but allows free passage of air. The bag was transferred to a thermostatic chamber maintained at 23° C. and 50% relative humidity under ambient pressure. The beads-containing bag was placed on a weighing device in the thermostatic chamber and weighed. The weight measurement was carried out 120 seconds after the expanded beads had been taken out of the pressure tank. The measured weight was Q (g).

The beads-containing bag was then allowed to stand for 48 hours in the same thermostatic chamber. The pressurized air in the expanded beads gradually permeated through the cell walls and escaped from the beads. Therefore, the weight of the beads decreased with the lapse of time. However, an equilibrium had been established and the weight had been substantially stabilized after lapse of a period of 48 hours. Thus, the weight of the bag containing the expanded beads was measured again in the same thermostatic chamber after the lapse of the 48 hours period to give a value of U (g). The expanded beads were taken out of the bag to weigh the weight (Z g) of the empty bag. Any of the above weight was measured with accuracy of 0.0001 g. The difference between Q (g) and U (g) was an amount W (g) of air increased. The inner pressure P (MPa (G)) of the expanded beads was calculated according to the formula (12) shown below:

$$P=(W/M)\times R\times T/V \qquad (12)$$

wherein, M is the molecular weight of air (here, a constant of 28.8 (g/mol) is used), R is the gas constant (here a constant of 0.0083 (MPa·L(K·mol) is used), T represents an absolute temperature (and is 296K because 23° C. is used), and V represents a volume (L) obtained by subtracting the volume of the base resin of the group of the expanded beads from the apparent volume of the group of the expanded beads.

The maximum bending deflection of the expanded beads molded articles was measured according to the method specified in JIS K7221-2(1999). More specifically, a test piece having a size of 120×25×20 mm (surfaces are all cut surfaces) cut out from the expanded beads molded article was measured by autograph device (manufactured by Shimadzu Corporation) with a span between fulcrums of 100 mm and a test speed of 10 mm/min.

Evaluation of Fusion Bonding Strength:

The fusion bonding strength of the expanded beads molded articles obtained in Examples and Comparative Examples were evaluated based on the equational relationship between their maximum bending deflection Y (mm) and bulk density X (g/L) as follows:

A: (Y≥5) and (Y≥−0.2X+25)
B: (Y≥5) and (−0.2X+20≤Y<−0.2X+25)
C: (Y<5) or (Y<−0.2X+20)

The invention claimed is:

1. A process for producing a polyolefin-based resin expanded beads molded article having interconnected void spaces, comprising:
   providing multi-layered polyolefin-based resin expanded beads each having a cylindrical, polyolefin-based resin expanded core layer and a polyolefin-based resin outer layer covering the expanded core layer,
   filling the multi-layered polyolefin-based resin expanded beads in a mold cavity, and
   then introducing steam in the mold cavity to heat the multi-layered polyolefin-based resin expanded beads filled in the mold cavity, so that the multi-layered polyolefin-based resin expanded beads are fuse-bonded together and molded in the mold cavity,
   wherein said provided multi-layered polyolefin-based expanded beads satisfy the following requirements (a) to (d),
   (a) the multi-layered polyolefin-based resin expanded beads have an apparent density of 10 to 200 g/L, and (b) the multi-layered polyolefin-based resin expanded beads, when measured by heat flux differential scanning calorimetry in which 2 to 10 mg thereof are heated from 23° C. to 220° C. at a heating speed of 10° C./min, give a DSC curve having an endothermic peak "A" which is intrinsic to the polyolefin-based resin and one or more endothermic peaks "B" which are located on a higher temperature side of the endothermic peak "A" and which have a heat of fusion of 50 J/g or less, and (c) the polyolefin-based resin forming the expanded core layer of each of the multi-layered polyolefin-based resin expanded beads has a melting point Tc and the polyolefin-based resin forming the outer layer of each of the multi-layered polyolefin-based resin expanded beads has a melting point Ts, wherein Tc and Ts satisfy the equation Tc(° C.)>Ts(° C.), (d) each of the multi-layered polyolefin-based resin expanded beads satisfies the equations $d_{MIN} \geq 1.0$ (mm) and $d_{MIN}/D_{MIN} \leq 0.70$, and wherein $d_{MIN}$ represents a minimum diameter in mm of the throughhole of the multi-layered polyolefin-based resin expanded bead as measured on a cross-section taken along a plane normal to the axial direction of the throughhole and $D_{MIN}$ represents a minimum diameter in mm of the expanded bead as measured on said cross-section, and (e) the polyolefin-based resin expanded core layer and the polyolefin-based resin outer layer are formed of polypropylene-based resins, wherein the polypropylene-based resin forming the expanded core layer has a bending modulus of Mc and the polypropylene-based resin forming the outer layer has a bending modulus of Ms and wherein Mc and Ms satisfy the equations $Mc \leq 1300$ (MPa) and $50 \leq Mc-Ms \leq 600$ (MPa).

2. The process for producing a polyolefin-based resin expanded beads molded article according to claim 1, wherein the apparent density of the multi-layered polyolefin-based resin expanded beads is in such a relationship with a bulk density thereof as to meet the equation $40 \leq ((\text{apparent density}-\text{bulk density})/\text{apparent density}) \times 100 \leq 70$.

3. The process for producing a polyolefin-based resin expanded beads molded article according to claim 1, wherein the molding vapor pressure used for molding in the mold cavity is 0.3 MPa(G) or less.

4. A polyolefin-based resin expanded beads molded article obtained by molding, in a mold cavity, multi-layered expanded beads each of which has a cylindrical, polyolefin-based resin expanded core layer and a polyolefin-based resin outer layer covering the expanded core layer and satisfies the equation Tc(° C.)>Ts(° C.) wherein Tc represents a melting point of the polyolefin-based resin forming the expanded core layer and Ts represents a melting point of the polyolefin-based resin forming the outer layer, said expanded beads molded article having a bulk density of 10 to 100 g/L and a porosity of 20% or higher and less than 50%, said expanded beads molded article, when measured by heat flux differential scanning calorimetry in which 2 to 10 mg thereof are heated from 23° C. to 220° C. at a heating speed of 10° C./min, shows an endothermic peak "C" which is intrinsic to the polyolefin-based resin and one or more endothermic peaks "D" which are located on a higher temperature side of the endothermic peak "C" and which have a heat of fusion of 50 J/g or less, said expanded beads molded article having a maximum bending deflection Y, in mm, which satisfies the equations $Y \geq 5$ and $Y \geq -0.2X+20$ wherein Y represents the maximum bending deflection in mm as measured by a bending test method according to JIS K7221-2 (1999) and X represents a bulk density in g/L of the polyolefin-based resin expanded beads molded article, wherein the polyolefin-based resin expanded core layer and the polyolefin-based resin outer layer are formed of polypropylene-based resins, and wherein the polypropylene-based resin forming the expanded core layer has a bending modulus of Mc and the polypropylene-based resin forming the outer layer has a bending modulus of Ms and wherein Mc and Ms satisfy the equations $Mc \leq 1300$ (MPa) and $50 \, Mc-Ms \leq 600$ (MPa).

* * * * *